United States Patent [19]
Farber et al.

[11] Patent Number: 5,903,760
[45] Date of Patent: May 11, 1999

[54] METHOD AND APPARATUS FOR TRANSLATING A CONDITIONAL INSTRUCTION COMPATIBLE WITH A FIRST INSTRUCTION SET ARCHITECTURE (ISA) INTO A CONDITIONAL INSTRUCTION COMPATIBLE WITH A SECOND ISA

[75] Inventors: Yaron Farber, Haifa, India; Yossi Levhari, Hofit, Israel; Leonid Baraz, Kiryat Ata, Israel; Gallia Ladiray, Jerusalem, Israel

[73] Assignee: Intel Corporation, Santa Clara, Calif.

[21] Appl. No.: 08/669,772

[22] Filed: Jun. 27, 1996

[51] Int. Cl.⁶ .................................................. G06F 9/455
[52] U.S. Cl. .......................................... 395/707; 395/568
[58] Field of Search ............................... 395/385, 568, 395/705, 707, 708, 709

[56] References Cited

U.S. PATENT DOCUMENTS

| | | | |
|---|---|---|---|
| 4,951,195 | 8/1990 | Fogg, Jr. et al. | 395/500 |
| 5,241,678 | 8/1993 | Futamura et al. | 395/705 |
| 5,301,325 | 4/1994 | Benson | 395/707 |
| 5,313,614 | 5/1994 | Goettelmann et al. | 395/705 |
| 5,598,560 | 1/1997 | Benson | 395/707 |

OTHER PUBLICATIONS

Motorola, *MC68030 Enhanced 32–bit Microprocessor User's Manual*, Second Edition, Prentice Hall, 1989, pp. 3–71 to 3–72.

Gaines, R. Stockton, On the Translation of Machine Language Programs, Communications of the ACM, vol. 8, No. 12, Dec. 1965, pp. 736–741.

Bergh et al., *HP 3000 Emulation on HP Precision Architecture Computers*, Hewlett–Packard Journal, Dec. 1987, pp. 87–89.

Hunter et al., *DOS at RISC*, Byte, Nov. 1989, pp. 361–368.

Saari, Michael, *68000 Binary Code Translator*, FORML Conference Proceedings, 1987, pp. 48–52.

Banning, John, *The XDOS Binary Code Conversion System*, IEEE, 1989, pp. 282–287.

*Primary Examiner*—Richard L. Ellis
*Attorney, Agent, or Firm*—Blakely, Sokoloff, Taylor & Zafman

[57] ABSTRACT

A method for increasing the performance of binary translated conditional instructions. According to one embodiment of the invention, a conditional instruction compatible with the first ISA is decoded. The condition of the conditional instruction is dependent on at least on status flag. The conditional instruction is translated to be compatible with a second ISA, wherein the condition of the conditional instruction is altered to be dependent on a previously computed difference between two values, the difference residing in a memory location.

26 Claims, 2 Drawing Sheets

METHOD AND APPARATUS FOR TRANSLATING A CONDITIONAL INSTRUCTION COMPATIBLE WITH A FIRST INSTRUCTION SET ARCHITECTURE (ISA) INTO A CONDITIONAL INSTRUCTION COMPATIBLE WITH A SECOND ISA

FIELD OF THE INVENTION

The invention relates to computer systems, and, in particular, to methods for increasing the performance of certain types of instructions.

BACKGROUND OF THE INVENTION

Most often, computer programs are initially written in high-level program statements. In order to be executed by a computer, the program statements are compiled into machine instructions that a microprocessor can recognize and execute. The machine instructions are selected from a set of machine instructions unique to a particular Instruction Set Architecture (ISA).

In the field of ISAs, there have arisen two fundamentally different types of instruction sets: the Complex Instruction Set Computer architecture (CISC) and the Reduced Instruction Set Computer architecture (RISC). The CISC architecture utilizes an instruction set that allows for complicated and flexible ways of calculating such elements as memory addresses. One of the defining characteristics of the CISC architecture is the use of variable length instructions, which adds additional complexity to the decoding hardware. Although very powerfully, all the complexity of the CISC instruction set usually requires additional clock cycles to execute each machine instruction.

A RISC processor, on the other hand, is designed to operate more efficiently by processing a relatively smaller set of instructions. The RISC design is based on the premise that most of the instructions a computer decodes and executes are simple. As a result, RISC architecture limits the number of instructions that are built into the microprocessor, and optimizes each so it can be carried out very rapidly, usually within a single clock cycle.

It is possible for computer program statements that have been compiled into machine instructions for a CISC processor to be translated in order to be executed on a RISC processor. This translation process is normally carried out by a binary translator, which typically consist of a set of instructions stored in memory.

The RISC machine executes the translated instructions by using the RISC instruction set to emulate how the untranslated instructions would be executed on a CISC processor. Practitioners in the art will understand, that when a RISC processor emulates a CISC program, many of the inherent performance advantages of the RISC processor are missed.

Consider, for example, the conditional instruction. A conditional instruction performs an operation, such as transferring the flow of execution from one instruction to another, when a specified condition is true. If the condition is false, the conditional instruction is treated as a no-operation (i.e., an instruction having no effect on the machine's current architectural state).

A conditional instruction is typically based on the results of a previously executed arithmetic instruction, such as the compare instruction. A compare instruction, when executed on a CISC processor, compares two values by subtracting one value from a second value and updates a set of status flags based on the difference of the two values. The actual difference generated by the comparison, however, is not saved in a memory location (i.e., is architecturally transparent).

The status flags are typically represented by one-bit fields in a dedicated register. In one prior art CISC ISA, the status flags include a Zero Flag (ZF) indicating the difference is 0, a Sign Flag (SF) representing the most significant bit of the difference, and an Overflow Flag (OF) indicating the difference is too large or too small to be represented in the number of bits allocated to store the result.

The conditional instruction, when executed on a CISC processor, evaluates a logical combination of the status flags in order to determine whether the condition of the conditional instruction is met. In one example, the conditional instruction evaluates the complex expression (ZF=1 or SF!= OF).

The RISC microprocessor, however, typically has no native support for setting status flags (i.e., dedicated registers). Therefore, a RISC processor emulates a CISC processor executing a compare instruction by allocating bit fields within a general purpose register for the setting of status flags.

To emulate a conditional instruction evaluating the set of status flags, the RISC processor employs a series of instructions provided in the RISC instruction set. Use of the series of RISC instructions, however, misses the performance advantage of the RISC processors. Typically, the instruction set of a RISC processor includes one conditional instruction that efficiently evaluates a single value generated by a previously executed compare instruction.

Therefore, it can be appreciated that there is a need for a method of translating conditional instructions that are originally dependent on a logical combination of status flags, to be dependent on an actual difference generated by a previously executed compare instruction.

SUMMARY AND OBJECTS OF THE INVENTION

The present invention provides a method for increasing the performance of binary translated conditional instructions. According to one embodiment of the invention, a conditional instruction compatible with a first ISA is decoded. The condition of the conditional instruction is dependent on at least one status flag.

The conditional instruction is then translated to be compatible with a second ISA, wherein the condition of the conditional instruction is altered to be dependent on a previously computed difference between two values.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method is described for increasing the performance of binary translated conditional instructions executed on a computer system that has no native support for setting status flags.

The present invention translates instructions from a source architecture instruction set that includes support for status flags, to a target architecture instruction set that has no native support for status flags. For example, the source architecture instruction set may be the instruction set of a CISC, Very Long Instruction Word computer (VLIW), or a RISC architecture having native support for status flags, and the target architecture instruction set may be the instruction set of a RISC, or other computer architecture that has no support for status flags.

Each conditional instruction translated by the present invention is typically included in a separate basic block of instructions (BB). The basic block of instructions are translated one at a time.

A basic block of instructions typically includes a contiguous sequence of non-branch machine-instructions ending with a conditional branch instruction. Most computer programs, such as the CISC program of FIG. 1, consists of multiple basic blocks of instructions stored in a physical static sequence (e.g., $BB_1$, $BB_2$, $BB_3$ ... ). The basic blocks of the CISC program shown in FIG. 1 are instructions compiled to be executed on a CISC program.

Figure 1:
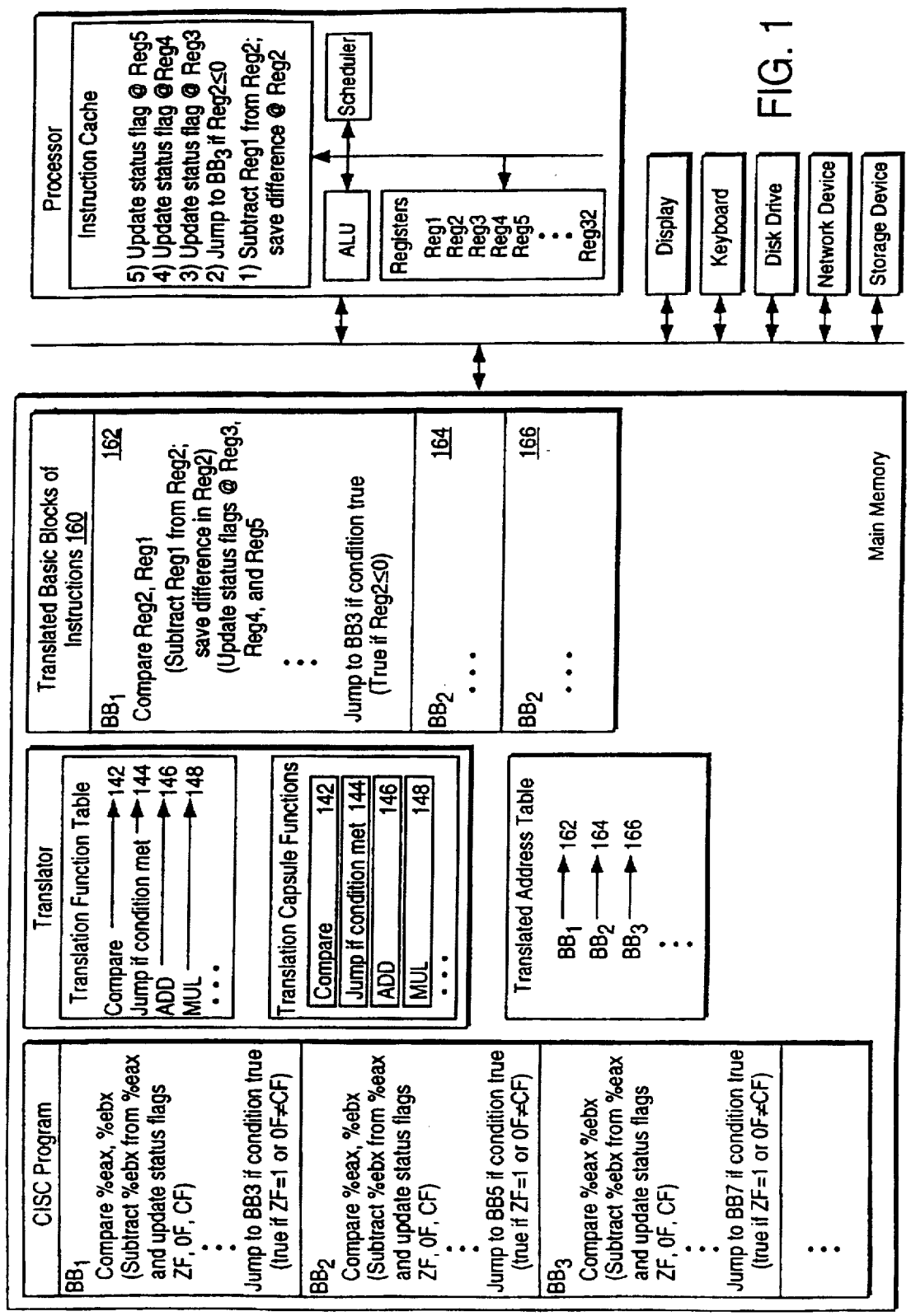
FIG. 1 illustrates a computer system capable of implementing one embodiment of the present invention.

The instructions of each basic block of instructions in the CISC program are translated sequentially by the translator shown in the memory of FIG. 1. In alternative embodiments, the translator of the present invention may be stored on other computer-readable mediums, including magnetic and optical disk, and other random-access memory devices, accessible via the disk drive shown in FIG. 1.

During the translation process each instruction is first decoded into an opcode and operands by the decode procedure shown stored in the translator of FIG. 1. A decoded instruction is then translated by one of the translation capsules shown in the translator.

A hash value of a decoded instructions opcode is used to index the Translation Capsule Table shown in the translator. The table in turn provides the address of a translation capsule corresponding to the opcode of the decoded instruction. For example, the opcode for the compare instruction may hash to an entry containing the address value 142 for the compare instruction's translation capsule, as shown in FIG. 1.

The translation capsule that corresponds to a decoded instruction's opcode provides a sequence of instructions from the target architecture instruction set in place of the decoded instruction's opcode. In addition, the capsule function translates the memory addresses of the decoded instruction's operands to be compatible with the memory addresses of the target architecture.

CISC program instructions translated by the translator are stored in the area of memory allocated for storing Translated Basic Blocks of instructions 160 shown in FIG. 1. These instructions are compatible with the target architecture instruction set.

Figure 2:
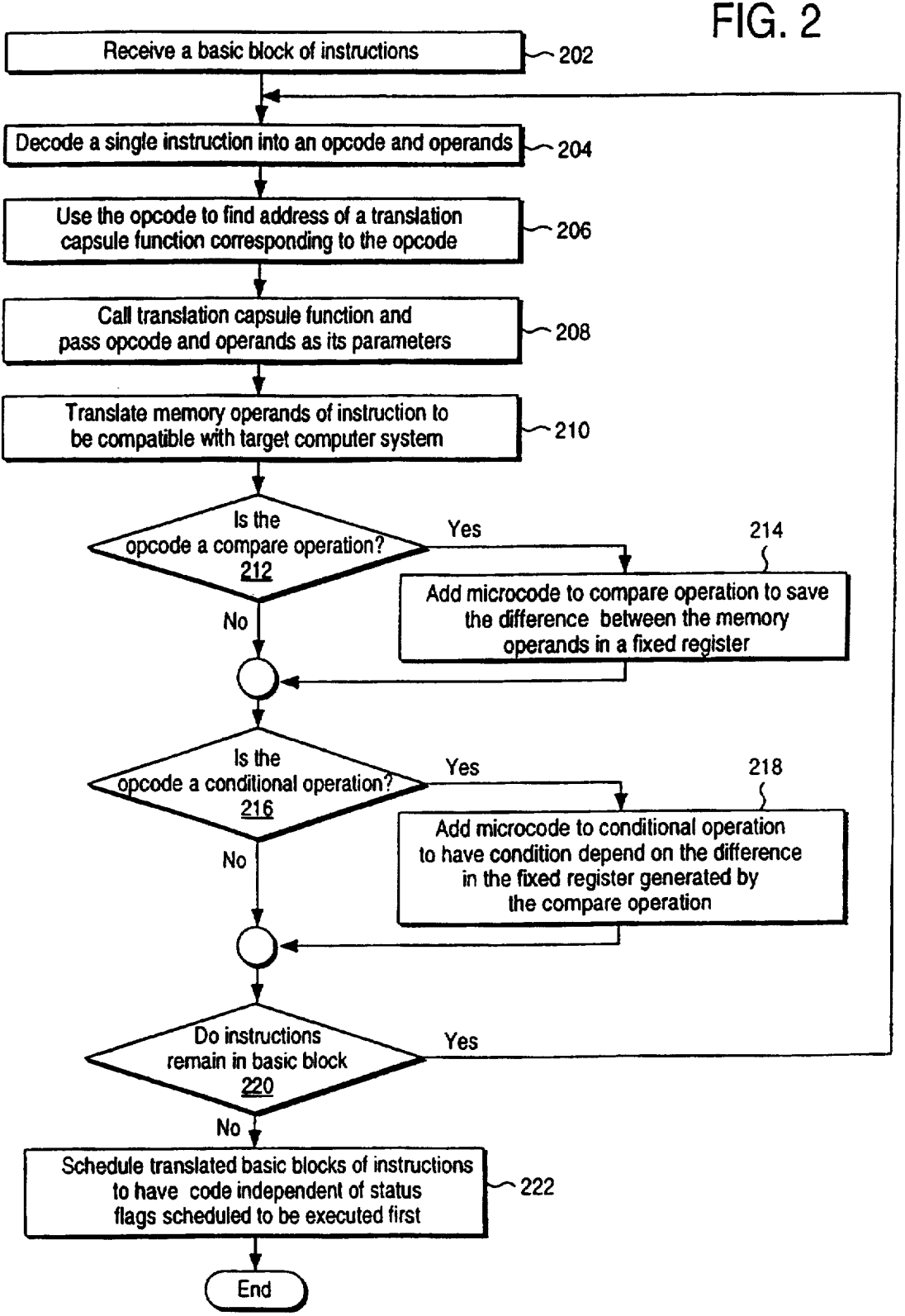
FIG. 2 is a flow diagram describing the steps in one embodiment of the present invention.

FIG. 2 is a flow diagram describing the steps performed to increase the performance of translated conditional instructions according to one embodiment of the present invention. In block 202, a program counter identifies a basic block of untranslated instructions.

In block 204, a first instruction from the basic block of instructions is decoded by the translator into an opcode and operands. The opcode indicates an operation to be performed by the instruction, and the operands identify a register, cache, or memory location storing data to be operated on by the opcode.

In one embodiment of the present invention, the instruction is decoded by a procedure that includes a separate sequence of instructions stored in the translator. In alternative embodiments, the instructions can be decoded by a procedure stored in memory outside the translator or provided in a hardware component.

In block 206, the translator selects a translation capsule function that corresponds to the opcode of the decoded instruction by hashing the opcode to get an index value from the Translation Capsule Table as described above. The capsule function is selected from a set of translation capsule functions stored in the translator. Each capsule function provides a separate sequence of instructions in place of the decoded instructions opcode in order to emulate the execution the decoded instruction on the target computer architecture. The instructions provided from the capsule function are selected from the instruction set of the target architecture.

In addition, the capsule functions translate the memory addresses of the decoded instruction's operands to be compatible with the memory addresses of the target architecture. The translation may consist of adding the decoded instructions operands to an offset base address of the target architecture.

In one embodiment, the translation capsules are indexed in a table by a hash value of the opcodes from the source computer architecture instruction set (e.g., the 12 least significant bits of each opcode). The hash value of the decoded instructions opcode is then used to determine the location of the corresponding translation capsule in the table. Each entry in the table includes the address of the translation capsule corresponding to the opcode, and may include other information regarding the translation capsule, such as whether the opcode takes memory operands.

In block 208, the selected translation capsule function is called and receives the decoded instructions operands and opcode as its parameters. In response, the capsule provides a series of instructions in place of the decoded instructions opcode, translates the memory addresses of the decoded instructions operands, and stores the results in an area of memory allocated to store translated basic blocks of instructions.

If the instruction being translated is a compare instruction, in block 210 the respective capsule function provides a series of instructions that generate a difference between two values and save the difference in a memory location. The memory location may include a general register or an address space of a cache on a processor, for when the translation is performed dynamically (i.e., during execution of a program), or the memory location may be an address space on a disk, for when the translation is performed statically (i.e., when program is not being executed).

For example, a compare instruction compiled to be executed on the source architecture may include the operations of (subtract register % ebx from register % eax and update status flags ZF, OF, and CF), as shown in BB1 of the CISC program in FIG. 1. On the other hand, a compare instruction translated by the present invention may include the operations of (subtract reg1 from reg2 and save difference in reg3), as shown in translated basic block of instructions 162 in FIG. 1.

In one embodiment, an additional set of instructions is provided by the respective capsule function to emulate setting the status flags as part of the translated compare instruction. The flag updating operations are included because subsequent instructions in the program may depend on the settings of the flags. In one embodiment, the flags are emulated by allocating bit fields within a general purpose register.

In alternative embodiments, other arithmetic instructions that update status flags based on the results of a data operation may be translated in a similar manner.

If the instruction being translated is a conditional instruction, in block 212 the respective capsule function provides a series of instructions in order to have the condition of the translated conditional operation depend directly on the difference generated by the most recently executed translated compare instruction. The instructions provided by the function reference the memory location where the difference generated by the most recently executed compare instruction has been saved. No status flag evaluating instructions, however, are provided.

For example, the condition of a conditional instruction compiled to be executed on the source architecture may include the operations of (true if ZF=1 or, OF !=CF), as shown in BB1 of the CISC program in FIG. 1. On the other hand, the condition of a conditional instruction translated by the present invention may include the operation (true if reg3≦0), as shown in translated basic block of instructions 162 in FIG. 1.

Typically, computer architectures that have no native support for status flags provide a conditional instruction, in their instruction set, that depends on a single value stored in a register. Therefore, conditional instructions translated by the present invention benefit from better utilization of the more efficient target computer architecture.

In decision block 214, it is determined whether additional machine instructions remain in the basic block of instructions to be translated. If any instructions remain to be translated, the remaining instructions are translated in steps similar to those described in blocks 204–212.

Once the basic block of instructions has been translated, an address for the translated basic block of instructions can be entered into a translated address table. As a result, when the basic block of instructions is called to be executed, the translated address table will provide the address of the translated basic block of instructions.

In block 216 the translated instructions of the basic block of instructions are re-scheduled by the translator to be executed by a processor in an order based on inter-instruction dependencies, which is commonly referred to as the critical path of execution. In one embodiment, the critical path of execution includes the instructions of a translated compare instruction which generates and saves a difference between two values in a memory location. These instructions are followed by the translated conditional instruction which evaluates the difference in the memory location.

The instructions of the translated compare instruction that update the status flags are scheduled to be executed by a processor after the critical path of execution, as shown in the translated basic block of instructions 162 in FIG. 1. As a result, the critical path of executing the translated compare and the translated conditional instruction is shorter and faster than it would be if it included the instructions to update the status flags.

In an alternative embodiment, the instructions of the translated compare instruction may be scheduled to save the difference to a memory location and update the status flags in parallel when the present invention is performed on a computer system having a processor that is able to execute multiple instructions per clock cycle. This type of processor is commonly referred to as a superscalar processor.

The parallel execution is performed by identifying a group of instructions that do not conflict with each other, or require use of the same functional unit. These instructions are then scheduled to be executed in the same clock cycle.

In the foregoing specification, the invention has been described with reference to specific exemplary embodiments thereof. It will, however, be evident that various modifications and changes may be made thereto without departing from the broader spirit and scope of the invention. For instance, the present invention may be performed dynamically during the execution of a computer program or statically when the program is not being executed. Moreover, where it has been shown that the binary translator, CISC program, translated basic blocks, and translated address table are stored in memory, these items and instructions can also be stored on other computer-readable mediums, including magnetic and optical disk, and other random-access memory devices. The specification and drawings are, accordingly, to be regarded in an illustrative rather than restrictive sense.

What is claimed is:

1. A machine-implemented method for translating a conditioned instruction compatible with a first Instruction Set Architecture (ISA) into a conditional instruction compatible with a second ISA, the method comprising the steps of:
   a) decoding a conditional instruction compatible with the first ISA, wherein a condition of the conditional instruction is dependent on at least one status flag when executed on the first ISA; and
   b) translating the conditional instruction to be compatible with the second ISA, wherein the condition of the conditional instruction is altered to not be dependent on the status flag when executed on the second ISA.

2. The method of claim 1, wherein the method of translating the conditional instruction includes translating the conditional to be dependent a previously computed difference between two values stored in a memory location.

3. The method of claim 2, further including the following steps prior to the step of decoding a conditional instruction:
   c) decoding an arithmetic instruction compatible with the first instruction set, the arithmetic instruction when executed, generates the difference between two values and updates said status flag, wherein the difference is architecturally transparent to the first ISA; and
   d) translating the arithmetic instruction to be compatible with the second ISA, wherein the arithmetic instruction is altered to not update the status flag in a critical path of execution when executed on the second ISA, the arithmetic instruction is further altered to have the arithmetic instruction when executed on the second ISA generate the difference between two values and place the difference in a memory location.

4. The method of claim 3, wherein the arithmetic instruction is a compare instruction.

5. The method of claim 4, wherein the method is performed during an execution of a computer program that includes the arithmetic instruction and the conditional instruction.

6. The method of claim 5, wherein the first ISA is a Complex Instruction Set Computer Architecture, and the second ISA is a Reduced Instruction Set Computer Architecture.

7. The method of claim 6, further including the step of:
   e) scheduling the arithmetic instruction to have the arithmetic instruction update the status flag outside a critical path of execution.

8. The method of claim 6, further including the step of:
   e) scheduling the arithmetic instruction to have the arithmetic instruction update the status flag and save the difference in the memory location, in parallel.

9. A machine-implemented method for translating conditional instructions to increase a performance of conditional instructions when executed on a computer architecture exclusive of native support for status flags, the method comprising the steps of:

decoding an arithmetic instruction, the arithmetic instruction, which when executed, generates a difference between a first value and a second value and updates at least one status flag, wherein the difference is transparent to the computer architecture exclusive of native support for status flags;

translating the arithmetic instruction to have the arithmetic instruction when executed generate the difference between the first value and the second value, wherein the difference is placed in a memory location;

decoding a conditional instruction, wherein a condition of the conditional instruction is dependent on the status flag; and translating the conditional instruction to have the condition of the conditional instruction not dependent on the status flag when the conditional instruction is executed on the computer architecture exclusive of native support for status flags.

10. A machine-implemented method for translating a first set instructions compatible with a first Instruction Set Architecture (ISA) into a second set of instructions compatible with a second ISA, the method comprising the steps of:

a) decoding an arithmetic instruction compatible with the first ISA, the arithmetic instruction which, when executed, generates a difference between two values and updates a status flag, wherein the difference is architecturally transparent to the first ISA; and b) translating the arithmetic instruction to be compatible with the second ISA, wherein the arithmetic instruction is altered to not update the status flag in a critical path of execution when executed on the second ISA, the arithmetic instruction is further altered to have the arithmetic instruction when executed on the second ISA generate the difference between two values and place the difference in a memory location.

11. A binary translator comprising:

means for decoding a conditional instruction compatible with a first ISA, wherein a condition of the conditional instruction is dependent on at least one status flag; and means for translating the conditional instruction to be compatible with the second ISA, wherein the condition of the conditional instruction is altered to not be dependent on the status flag when executed on the second ISA.

12. The binary translator of claim 11, wherein the means for translating the conditional instruction includes means for translating the conditional to be dependent a previously computed difference between two values stored in a memory location.

13. The binary translator of claim 12, further comprising:

means for decoding an arithmetic instruction compatible with the first ISA, the arithmetic instruction which when executed, generates the difference between two values and updates said status flag, wherein the difference is architecturally transparent to the first ISA; and means for translating the arithmetic instruction to be compatible with the second ISA, wherein the arithmetic instruction is altered to not update the status flag in a critical path of execution when executed on the second ISA, the arithmetic instruction is further altered to have the arithmetic instruction when executed on the second ISA generate the difference between two values and place the difference in a memory location.

14. The binary translator of claim 13, wherein the arithmetic instruction is a compare instruction.

15. The binary translator of claim 14, wherein the means for translating the arithmetic instruction and the means for translating the conditional instruction, translate the respective instructions during an execution of a computer program that includes the arithmetic instruction and the conditional instruction.

16. The binary translator of claim 15, wherein the first ISA is a Complex Instruction Set Computer Architecture, and the second ISA is a Reduced Instruction Set Computer Architecture.

17. The binary translator of claim 16, further comprising:

a means for scheduling the arithmetic instruction to have the arithmetic instruction update said status flag outside a critical path of execution.

18. The binary translator of claim 16, further comprising:

a means for scheduling the arithmetic instruction to have the arithmetic instruction update the status flag and save the difference at the memory location in parallel.

19. A machine readable-medium having stored thereon a plurality of a sequence of instructions for translating instructions, the sequence of instructions, which when executed by a processor, cause the processor to perform the steps of:

a) decoding a conditional instruction compatible with a first instruction set architecture (ISA), wherein a condition of the conditional instruction is dependent on at least one status flag; and b) translating the conditional instruction to be compatible with the second ISA, wherein the condition of the conditional instruction is altered to not be dependent on the status flag when executed on the second ISA.

20. The computer readable-medium of claim 19, wherein the method of translating the conditional instruction includes translating the conditional to be dependent a previously computed difference between two values stored in a memory location.

21. The computer readable-medium of claim 20, wherein the plurality of sequences of instructions further include additional instructions, which when executed by the processor, cause said processor to perform the steps of:

c) decoding an arithmetic instruction compatible with the first instruction set, the arithmetic instruction which when executed, generates the difference between two values and updates said status flag, wherein the difference is architecturally transparent to the first ISA; and d) translating the arithmetic instruction to be compatible with the second ISA, wherein the arithmetic instruction is altered to have the arithmetic instruction when executed generate the difference between two values and place the difference in the memory location.

22. The computer readable-medium of claim 21, wherein the arithmetic instruction is a compare instruction.

23. The computer readable-medium of claim 22, wherein the step of translating the arithmetic instruction and the step of translating the conditional instruction are performed during an execution of a computer program that includes the arithmetic instruction and the conditional instruction.

24. The computer readable-medium of claim 23, wherein the first ISA is a Complex Instruction Set Computer Architecture, and the second ISA is a Reduced Instruction Set Computer Architecture.

25. The computer readable-medium of claim 24, wherein the plurality of sequences of instructions further include additional instructions, which when executed by the processor, cause said processor to perform the step of:

e) scheduling the arithmetic instruction to have the arithmetic instruction update said status flag outside a critical path of execution.

26. The computer readable-medium of claim 24, wherein the plurality of sequences of instructions further include additional instructions, which when executed by the processor, cause said processor to perform the step of:

e) scheduling the arithmetic instruction to have the arithmetic instruction update the status flag and save the difference in a memory location, in parallel.

* * * * *